(12) United States Patent
Sakaki et al.

(10) Patent No.: US 11,067,966 B2
(45) Date of Patent: Jul. 20, 2021

(54) THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

(71) Applicant: FUJIFILM Business Innovation Corp., Tokyo (JP)

(72) Inventors: Shigeyuki Sakaki, Kanagawa (JP); Satoshi Hasebe, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/558,325

(22) Filed: Sep. 3, 2019

(65) Prior Publication Data

US 2020/0272130 A1 Aug. 27, 2020

(30) Foreign Application Priority Data

Feb. 26, 2019 (JP) .............................. JP2019-033190

(51) Int. Cl.
*G05B 19/4099* (2006.01)
*B33Y 50/00* (2015.01)
(Continued)

(52) U.S. Cl.
CPC ........ *G05B 19/4099* (2013.01); *B29C 64/386* (2017.08); *B33Y 50/00* (2014.12);
(Continued)

(58) Field of Classification Search
CPC ..... B29C 64/118; B29C 64/386; B33Y 50/00; G05B 19/4099; G05B 2219/35134; G05B 2219/49007
See application file for complete search history.

(56) References Cited

U.S. PATENT DOCUMENTS

2015/0251356 A1* 9/2015 Batchelder ............. B33Y 50/02 700/98
2017/0318186 A1* 11/2017 Morovic ............... B29C 64/393
2019/0232567 A1* 8/2019 Yamazaki ............. G09B 23/26

FOREIGN PATENT DOCUMENTS

JP 2003090758 3/2003
JP 2012-074072 4/2012
JP 2017-077671 4/2017

* cited by examiner

*Primary Examiner* — Chad G Erdman
(74) *Attorney, Agent, or Firm* — JCIPRNET

(57) ABSTRACT

A three-dimensional object data generation apparatus includes a physical property value obtaining unit that obtains, using three-dimensional object data indicating a three-dimensional object represented by plural three-dimensional elements, physical property values calculated by analyzing physical properties at a time when the three-dimensional object has been formed under a predetermined forming condition, the physical property values indicating the physical properties of the plural three-dimensional elements, a division unit that divides the three-dimensional object into plural sub-objects on a basis of a result of comparison between the physical property value of each of the plural three-dimensional elements and a predetermined threshold, a representative value calculation unit that calculates a representative value of physical property values of three-dimensional elements included in each of the plural sub-objects, and a generation unit that generates the three-dimensional object data by setting a forming condition corresponding to the representative value for each of the plural three-dimensional elements using predetermined correspondences between the representative values and forming conditions of a three-dimensional object forming apparatus that forms the three-dimensional object.

11 Claims, 10 Drawing Sheets

(51) Int. Cl.
*B29C 64/386* (2017.01)
*B29C 64/118* (2017.01)
(52) U.S. Cl.
CPC .. *B29C 64/118* (2017.08); *G05B 2219/35134* (2013.01); *G05B 2219/49007* (2013.01)

| No | PHYSICAL PROPERTY VALUE | FORMING CONDITIONS | | |
|---|---|---|---|---|
| | | MATERIAL | LAYER PITCH | ... |
| 1 | A TO B | ABS | 0.03 mm | ... |
| 2 | B TO C | ASA | 0.05 mm | ... |
| : | : | : | : | : |

FIG. 12

THREE-DIMENSIONAL OBJECT DATA GENERATION APPARATUS, THREE-DIMENSIONAL OBJECT FORMING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-033190 filed Feb. 26, 2019.

BACKGROUND

(i) Technical Field

The present disclosure relates to a three-dimensional object data generation apparatus, a three-dimensional object forming apparatus, and a non-transitory computer readable medium.

(ii) Related Art

In Japanese Unexamined Patent Application Publication No. 2003-090758, a method for simulating acoustic properties of an object is disclosed. The method at least includes (1) creating calculation models by dividing a shape of the object into a plurality of minute elements, (2) setting material physical properties of the object, (3) setting a forming condition of the object, (4) analyzing a forming process at a time when the object has been formed under the forming condition and a material physical property condition using the calculation models, (5) calculating local physical property data regarding the minute elements using the calculation models and a result of the analysis, (6) conducting at least either a characteristic value analysis or a frequency response analysis for obtaining a natural frequency of the object using the calculation models and the local physical property data, and (7) obtaining the acoustic properties of the object from the calculation models and the natural frequency.

In Japanese Unexamined Patent Application Publication No. 2012-074072, a method for fabricating a target object having a potential [x] generated in accordance with a field [f] applied to the target object by controlling the target object in three-dimensions. The method includes generating a computer-processable mathematical model of the target object by dividing data regarding an outer shape of the target object into a plurality of finite elements, identifying symmetry of physical property values of the finite elements, identifying values of the field [f] and the potential [x] relating to the finite elements, calculating an unknown physical property matrix [k] of a material of the target object on the basis of the expression [f]=[k] [x] and the symmetry, extracting a coefficient for the physical property values of the material from the calculated physical property matrix [k] for each of the finite elements in the computer-processable mathematical model of the target, comparing the extracted coefficient for the physical property values of the material and a coefficient for physical property values of a known material in order to match the extracted coefficient for the physical property values of the material and the coefficient for the physical property values of the known material, determining a fabrication parameter for controlling a fabrication apparatus for each of the finite elements of the target object on the basis of the matched coefficients for the physical property values of the materials, and generating a machine control instruction for controlling fabrication equipment in accordance with the fabrication parameters.

In Japanese Unexamined Patent Application Publication No. 2017-077671, a method for aiding additive manufacturing of a three-dimensional object is disclosed. The method includes inputting computer-aided design (CAD) regarding the three-dimensional object, creating slice data, performing manufacturing simulation on the basis of a manufacturing condition, and obtaining a condition under which at least either curvature deformation or residual stress falls within an allowable range by repeatedly performing the manufacturing simulation while changing the manufacturing condition.

SUMMARY

When physical properties of a three-dimensional object represented by three-dimensional elements are analyzed to calculate optimal physical property values and a process for setting forming conditions corresponding to the calculated physical property values for each of the three-dimensional elements, the process for setting forming conditions becomes complex as a shape of the three-dimensional object becomes complex.

Aspects of non-limiting embodiments of the present disclosure relate to a three-dimensional object data generation apparatus, a three-dimensional object forming apparatus, and a non-transitory computer readable medium capable of keeping the process for setting forming conditions from becoming complex, compared to when physical properties of a three-dimensional object divided into three-dimensional elements are analyzed to calculate optimal physical property values and the process for setting forming conditions corresponding to the calculated physical property values is performed for each of the three-dimensional elements.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a three-dimensional object data generation apparatus including a physical property value obtaining unit that obtains, using three-dimensional object data indicating a three-dimensional object represented by a plurality of three-dimensional elements, physical property values calculated by analyzing physical properties at a time when the three-dimensional object has been formed under a predetermined forming condition, the physical property values indicating the physical properties of the plurality of three-dimensional elements, a division unit that divides the three-dimensional object into a plurality of sub-objects on a basis of a result of comparison between the physical property value of each of the plurality of three-dimensional elements and a predetermined threshold, a representative value calculation unit that calculates a representative value of physical property values of three-dimensional elements included in each of the plurality of sub-objects, and a generation unit that generates the three-dimensional object data by setting a forming condition corresponding to the representative value for each of the plurality of three-dimensional elements using predetermined correspondences between the representative values and forming conditions of a three-dimensional object forming apparatus that forms the three-dimensional object.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described hereinafter with reference to the drawings.

Figure 1:
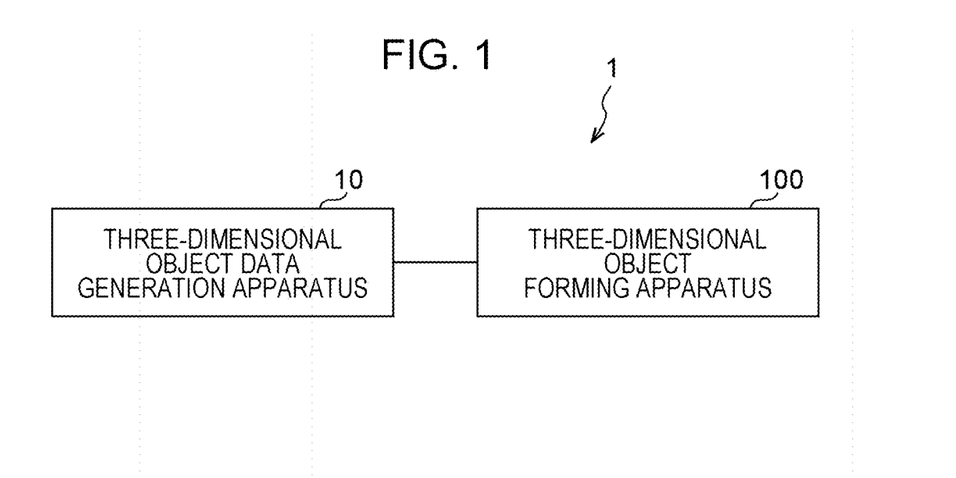
FIG. 1 is a block diagram illustrating a three-dimensional object forming system.

FIG. 1 is a diagram illustrating the configuration of a three-dimensional object forming system 1 according to the present exemplary embodiment. As illustrated in FIG. 1, the three-dimensional object forming system 1 includes a three-dimensional object data generation apparatus 10 and a three-dimensional object forming apparatus 100.

Figure 2:
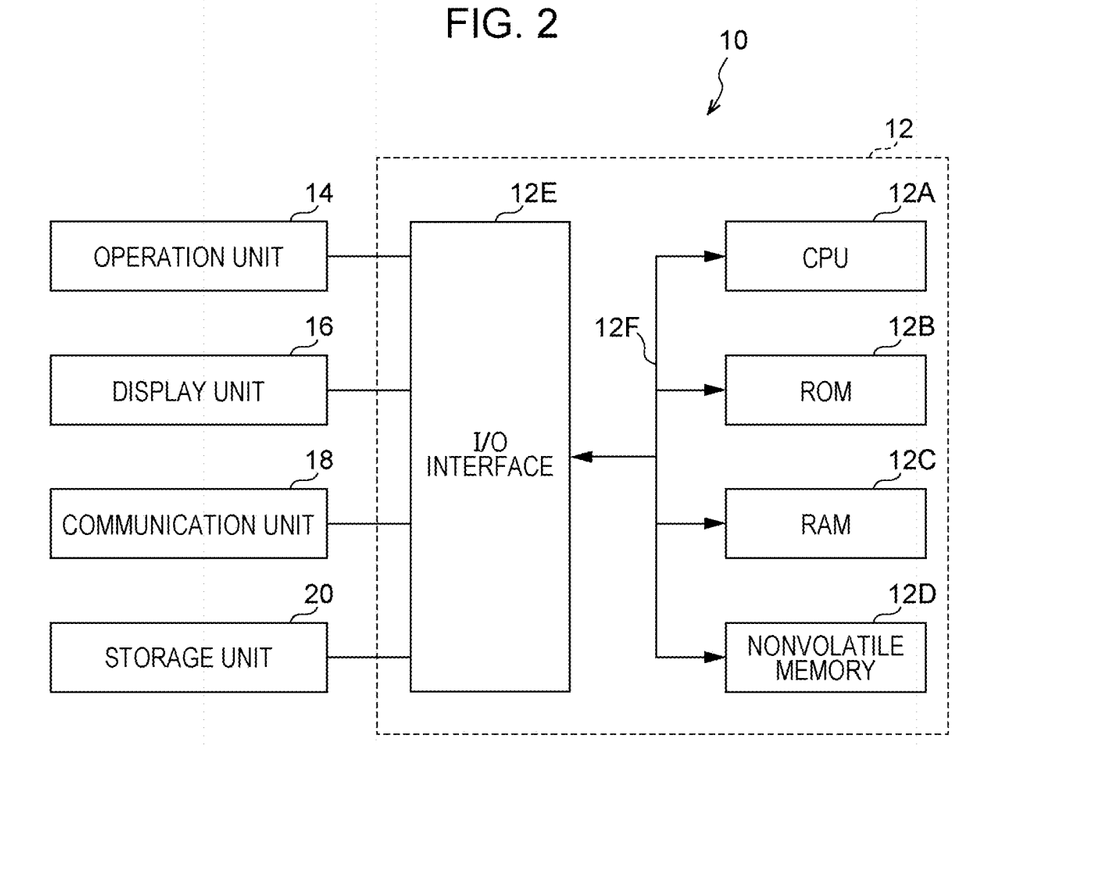
FIG. 2 is a block diagram illustrating the electrical configuration of a three-dimensional object data generation apparatus.

Next, the configuration of the three-dimensional object data generation apparatus 10 according to the present exemplary embodiment will be described with reference to FIG. 2.

The three-dimensional object data generation apparatus 10 is a personal computer, for example, and includes a controller 12. The controller 12 includes a central processing unit (CPU) 12A, a read-only memory (ROM) 12B, a random-access memory (RAM) 12C, a nonvolatile memory 12D, and an input/output (I/O) interface 12E. The CPU 12A, the ROM 12B, the RAM 12C, the nonvolatile memory 12D, and the I/O interface 12E are connected to one another through a bus 12F.

An operation unit 14, a display unit 16, a communication unit 18, and a storage unit 20 are connected to the I/O interface 12E.

The operation unit 14 includes, for example, a mouse and a keyboard.

The display unit 16 is, for example, a liquid crystal display.

The communication unit 18 is an interface for communicating data with external apparatuses such as the three-dimensional object forming apparatus 100.

The storage unit 20 is a nonvolatile storage device such as a hard disk and stores a program for generating three-dimensional object data, which will be described later, surface shape data, table data, which will be described later, and the like. The CPU 12A reads the program for generating three-dimensional object data stored in the storage unit 20 and executes the program.

Figure 3:
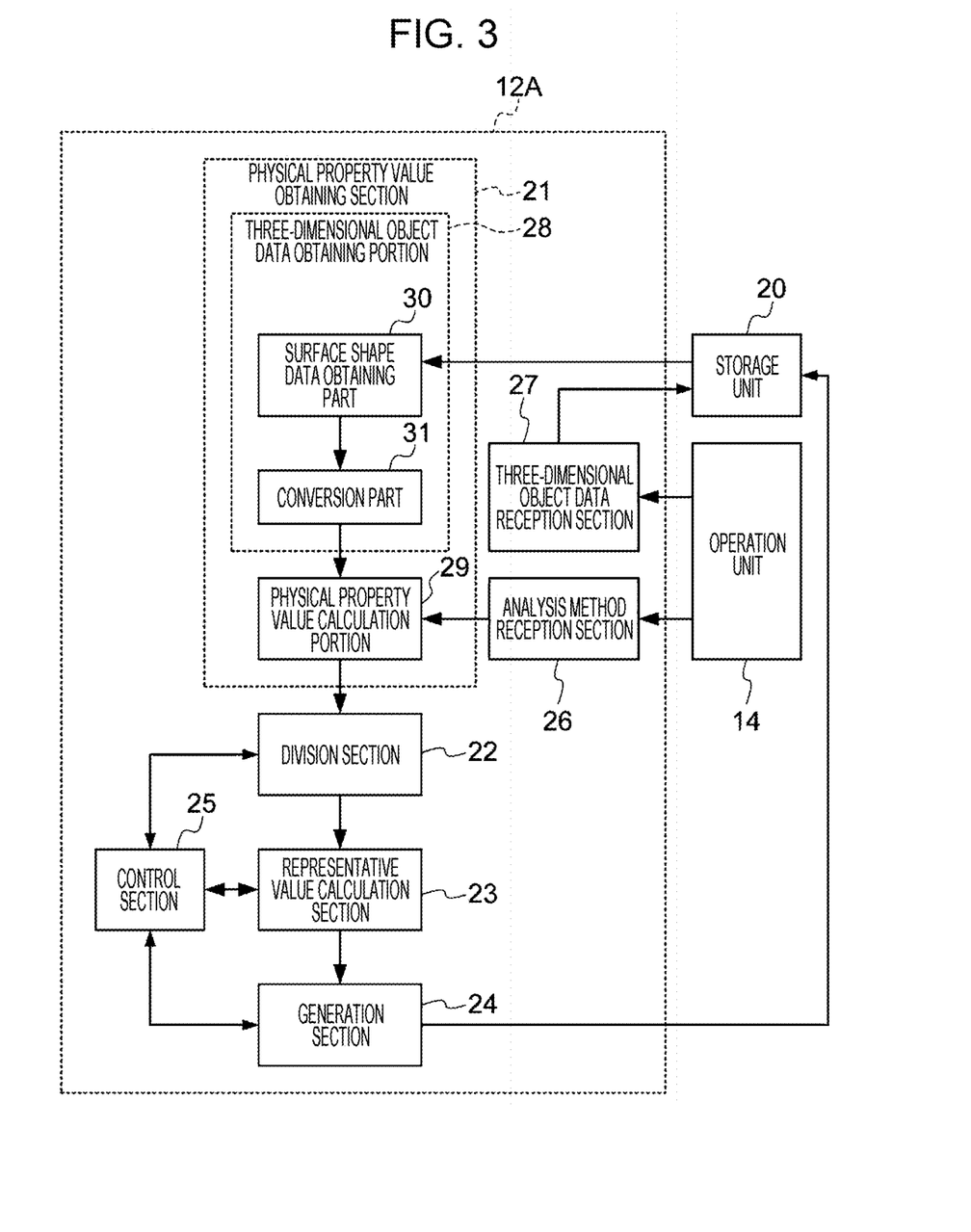
FIG. 3 is a block diagram illustrating the functional configuration of the three-dimensional object data generation apparatus.

Next, the functional configuration of the CPU 12A will be described.

As illustrated in FIG. 3, the CPU 12A includes, in terms of functions, a physical property value obtaining section 21, a division section 22, a representative value calculation section 23, a generation section 24, a control section 25, an analysis method reception section 26, and a three-dimensional object data reception section 27.

The physical property value obtaining section 21 obtains physical property values indicating physical properties of a plurality of three-dimensional elements, which represent a three-dimensional object, by analyzing, using three-dimensional object data indicating the three-dimensional object, physical properties at a time when the three-dimensional object has been formed under predetermined forming conditions.

Figure 4:
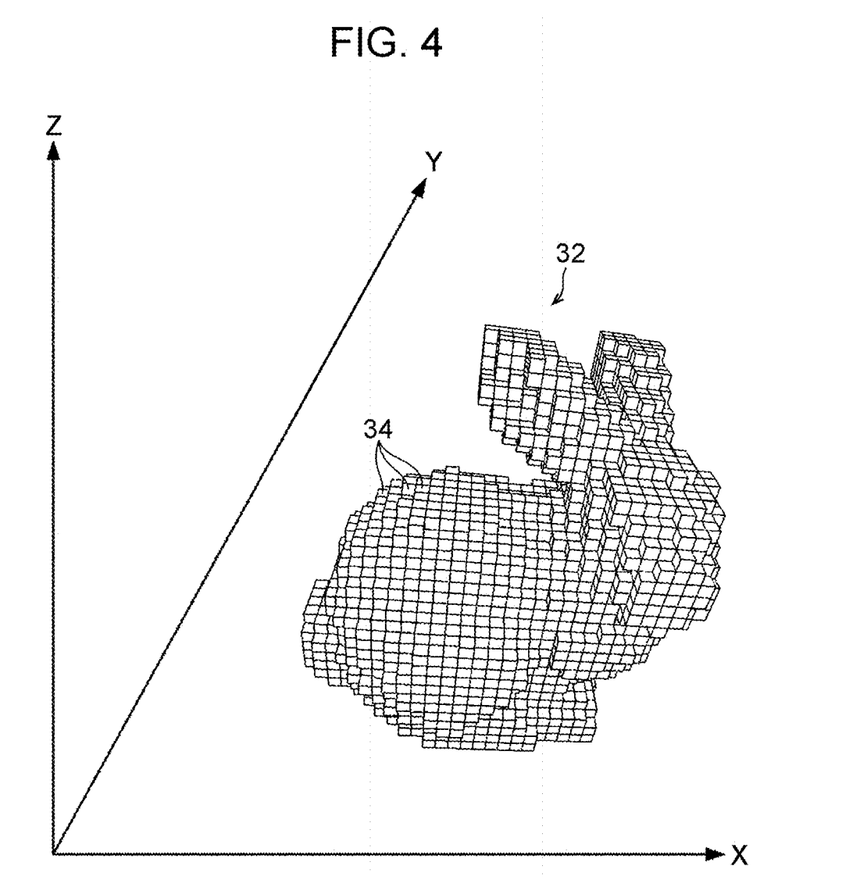
FIG. 4 is a diagram illustrating an example of a three-dimensional object represented by three-dimensional elements having shapes of rectangular parallelepipeds.

As an example, FIG. 4 illustrates a three-dimensional object 32 represented by a plurality of three-dimensional elements 34. As illustrated in FIG. 4, the three-dimensional object 32 includes the plurality of three-dimensional elements 34 having shapes of rectangular parallelepipeds.

The three-dimensional elements 34 are basic elements of the three-dimensional object 32. Although the three-dimensional elements 34 are rectangular parallelepipeds in the present exemplary embodiment, the three-dimensional elements 34 need not be rectangular parallelepipeds. For example, the three-dimensional elements 34 may be octahedrons, tetrahedrons, prisms, or pyramids, instead of hexahedrons such as rectangular parallelepipeds.

The physical property value obtaining section 21 includes a three-dimensional object data obtaining portion 28 and a physical property value calculation portion 29. The three-dimensional object data obtaining portion 28 obtains three-dimensional object data indicating a three-dimensional object represented by a plurality of three-dimensional elements. More specifically, the three-dimensional object data obtaining portion 28 includes a surface shape data obtaining part 30 and a conversion part 31.

The surface shape data obtaining part 30 obtains surface shape data indicating a surface shape of a three-dimensional object by, for example, reading the surface shape data from the storage unit 20. The surface shape data defines a surface of the three-dimensional object but does not define an internal structure. The surface shape data may be CAD data or stereolithography (STL) data, for example, but is not limited to these.

The conversion part 31 converts surface shape data into three-dimensional object data, which indicates a three-dimensional object represented by a plurality of three-dimensional elements. As a conversion method, an octree method, a Delaunay method, a bubble mesh method, or a method described in Japanese Unexamined Patent Application Publication No. 2018-153919, for example, may be used, but the conversion method is not limited to these.

If the storage unit 20 stores three-dimensional object data, the surface shape data obtaining part 30 and the conversion part 31 need not perform the processes. In this case, the three-dimensional object data obtaining portion 28 directly outputs the three-dimensional object data read from the storage unit 20 to the physical property value calculation portion 29.

The physical property value calculation portion 29 calculates physical property values indicating physical properties of a plurality of three-dimensional elements by analyzing, using three-dimensional object data, physical properties at a time when a three-dimensional object has been formed under predetermined forming conditions. More specifically, the forming conditions may include a condition that a three-dimensional object be formed with uniform physical properties, that is, formed by the same material, for example, but the forming conditions are not limited to this.

The physical property value calculation portion 29 analyzes physical properties of a plurality of three-dimensional elements using, for example, an analysis method corresponding to a function required for a three-dimensional object.

For the analysis method, for example, a finite element method is used. More specifically, a static stiffness analysis, a dynamic stiffness analysis, an elastoplastic analysis, or a heat transfer analysis is conducted, but the analysis method is not limited to these.

When the function required for a three-dimensional object is to minimize deformation of the three-dimensional object within a predetermined weight, for example, the static stiffness analysis is conducted. When the transient response and frequency response of a three-dimensional object are to be improved, the dynamic stiffness analysis is conducted. When the elastoplasticity of a three-dimensional object is to be optimized, the elastoplastic analysis is conducted. When the heat transfer performance of a three-dimensional object is to be maximized, the heat transfer analysis is conducted.

When the static stiffness analysis or the dynamic stiffness analysis is conducted, the physical property value calculation portion 29 calculates physical property values such as displacement, stress, elastic strain, elastic strain energy, or a safety factor of each nodal point, which is a vertex of three-dimensional elements. The safety factor is a value obtained by dividing a material yield stress by a von Mises stress.

When the elastoplasticity analysis is conducted, the physical property value calculation portion 29 calculates physical property values such as displacement, stress, or elastic strain of each nodal point.

When the heat transfer analysis is conducted, the physical property value calculation portion 29 calculates physical property values such as heat flux.

A user may specify the analysis method by operating the operation unit 14. In this case, the analysis method specified by the user is received by the analysis method reception section 26. The physical property value calculation portion 29 analyzes physical properties of a plurality of three-dimensional elements using the analysis method received by the analysis method reception section 26.

The physical property value calculation portion 29 may calculate physical property values by analyzing a plurality of types of physical properties and combine together the plurality of physical property values calculated. In this case, the physical property value calculation portion 29 may combine together the plurality of physical property values in accordance with combination ratios.

The division section 22 divides a three-dimensional object into a plurality of sub-objects on the basis of a result of comparison between a physical property value of each of a plurality of three-dimensional elements and a predetermined threshold. The division section 22 may add three-dimensional elements to boundary portions between the plurality of sub-objects so that the boundary portions between the plurality of sub-objects overlap each other.

The representative value calculation section 23 calculates a representative value of physical property values of three-dimensional elements included in each of a plurality of sub-objects. The representative value may be an average, a minimum value, a maximum value, or a median, but is not limited to these.

The generation section 24 generates three-dimensional object data by setting forming conditions corresponding to a representative value for each of a plurality of three-dimensional elements using predetermined correspondences between representative values and forming conditions of the three-dimensional forming apparatus 100 that forms a three-dimensional object.

The division section 22 may perform a process for dividing a three-dimensional object into a plurality of sub-objects for each of a plurality of thresholds. The representative value calculation section 23 may perform a process for calculating a representative value for each of a plurality of thresholds. The generation section 24 may generate three-dimensional object data for each of a plurality of thresholds.

In this case, the generation section 24 may output, in three-dimensional object data generated for the plurality of thresholds, only a piece of three-dimensional object data that satisfies a predetermined performance condition.

The user may operate the image reading unit 14 to select a piece of three-dimensional object data generated for the plurality of thresholds. In this case, the three-dimensional object data reception section 27 receives the piece of the three-dimensional object data selected by the user and stores the piece of the three-dimensional object data in the storage unit 20.

The control section 25 performs control such that the processes performed by the division section 22, the representative value calculation section 23, and the generation section 24 and a process for determining whether the three-dimensional object data generated by the generation section 24 satisfies the predetermined performance condition are repeated until the predetermined performance condition is satisfied.

The three-dimensional object forming apparatus 100 forms a three-dimensional object under forming conditions corresponding to the three-dimensional object data generated by the three-dimensional object data generation apparatus 10.

As a method for forming a three-dimensional object, for example, fused deposition modeling (FDM), in which a thermoplastic resin is plasticized and stacked to form a three-dimensional object, selective laser sintering (SLS), in which a laser beam is radiated onto a powdery metal material to form a three-dimensional object through sintering, an optical forming method, an inkjet method, or the like is used, but another method may be used, instead. In the present exemplary embodiment, a case where a three-dimensional object is formed using FDM will be described.

Figure 5:
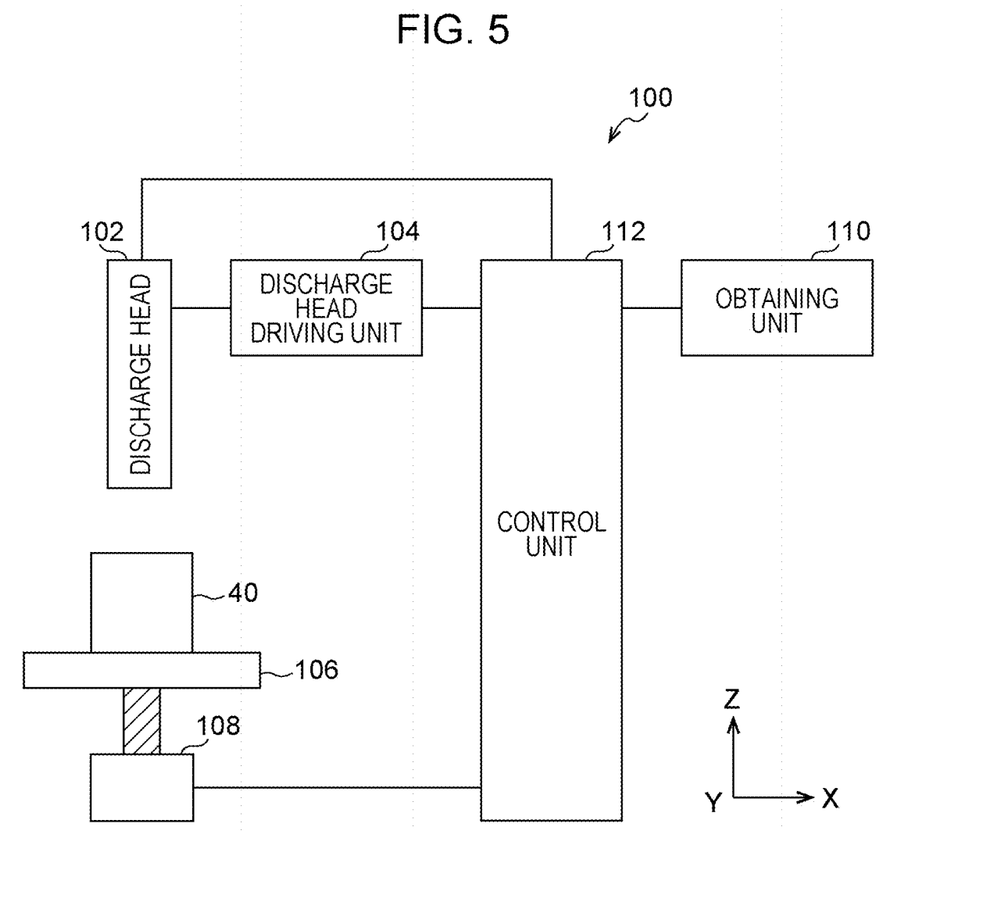
FIG. 5 is a diagram illustrating the configuration of a three-dimensional object forming apparatus.

Next, the three-dimensional object forming apparatus 100 will be described.

FIG. 5 illustrates the configuration of the three-dimensional object forming apparatus 100 according to the present exemplary embodiment. The three-dimensional object forming apparatus 100 forms three-dimensional objects through FDM.

As illustrated in FIG. 5, the three-dimensional object forming apparatus 100 includes a discharge head 102, a discharge head driving unit 104, a stand 106, a stand driving unit 108, an obtaining unit 110, and a control unit 112. The discharge head 102, the discharge head driving unit 104, the stand 106, and the stand driving unit 108 are an example of a forming unit.

The discharge head 102 includes a forming material discharge head that discharges a forming material for forming a three-dimensional object 40 and a support material discharge head that discharges a support material. The support material is used to support overhangs (also referred to as "projections") of a three-dimensional object and removed after the three-dimensional object is formed.

The discharge head 102 is driven by the discharge head driving unit 104 and moves on an X-Y plane in two dimensions. The forming material discharge head may include a plurality of discharge heads corresponding to forming materials of a plurality of attributes (e.g., colors).

The stand 106 is driven by the stand driving unit 108 and moves along a Z axis.

The obtaining unit 110 obtains three-dimensional object data and support material data generated by the three-dimensional object data generation apparatus 10.

The control unit 112 drives the discharge head driving unit 104 to move the discharge head 102 in two dimensions and controls the discharge of the forming material and the support material performed by the discharge head 102 such that the forming material is discharged in accordance with the three-dimensional object data obtained by the obtaining unit 110 and the support material is discharged in accordance with the support material data obtained by the obtaining unit 110.

Each time a layer has been formed, the control unit 112 drives the stand driving unit 108 to lower the stand 106 by a predetermined layer interval. As a result, a three-dimensional object based on three-dimensional object data is formed.

Figure 6:
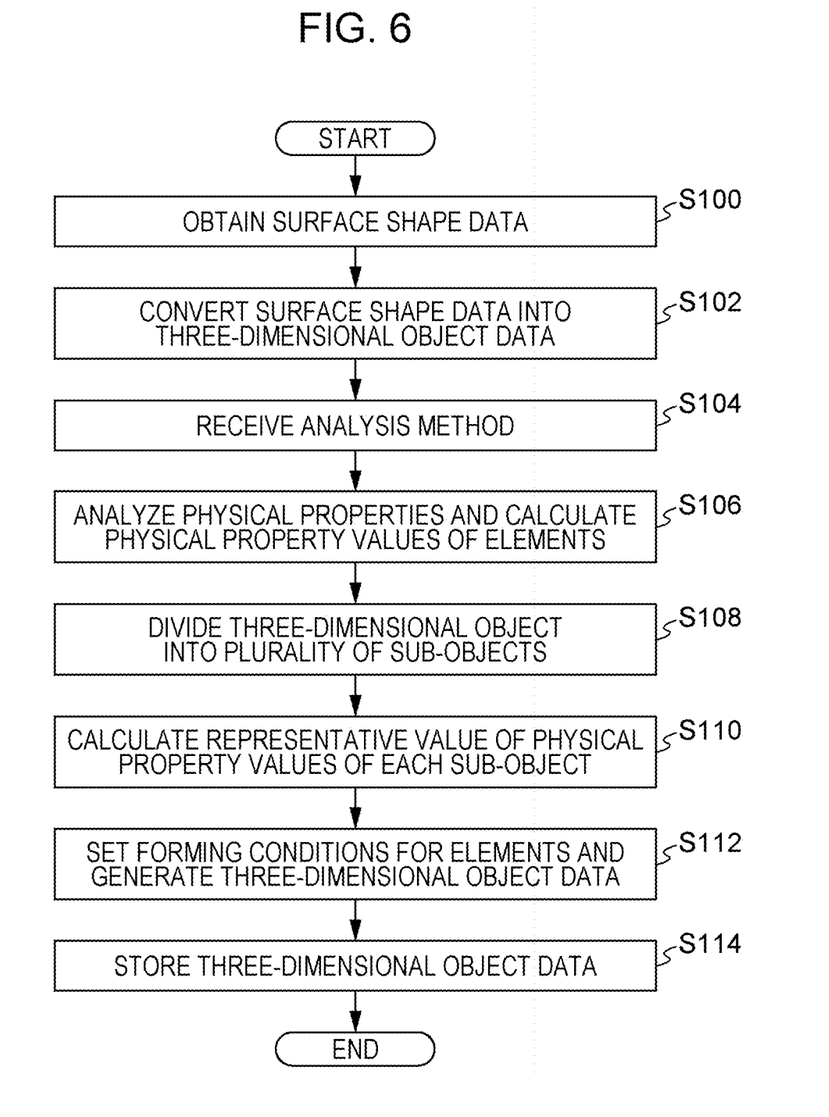
FIG. 6 is a flowchart illustrating a process based on a program for generating three-dimensional object data.

Next, the operation of the three-dimensional object data generation apparatus 10 according to the present exemplary embodiment will be described. A generation process illustrated in FIG. 6 is performed by executing a program for generating three-dimensional object data using the CPU 12A. The generation process illustrated in FIG. 6 is performed when, for example, the user has requested execution of the program. In the present exemplary embodiment, description of a process for generating support material data is omitted.

In step S100, surface shape data corresponding to a three-dimensional object to be formed is obtained by, for example, reading the surface shape data from the storage unit 20. Alternatively, surface shape data may be obtained from an external apparatus through the communication unit 18.

In step S102, the surface shape data obtained in step S100 is converted into three-dimensional data, which indicates a three-dimensional object represented by a plurality of three-dimensional elements.

If the storage unit 20 stores three-dimensional object data, the three-dimensional object data is read from the storage unit 20 instead of performing steps S100 and S102.

In step S104, an analysis method is received. More specifically, the display unit 16 displays a selection screen for selecting an analysis method corresponding to a function required for the three-dimensional object from a plurality of analysis methods such as the static stiffness analysis, the dynamic stiffness method, the elastoplastic analysis, and the heat transfer analysis. The analysis method selected by the user is then received as a method for calculating physical property values.

In step S106, physical property values indicating physical properties of the plurality of three-dimensional elements by analyzing physical properties at a time when the three-dimensional object has been formed under predetermined forming conditions, that is, at a time when the three-dimensional object has been formed with the same material, using the three-dimensional object data obtained as a result of steps S100 and S102. The analysis method received in step S104 is used as the analysis method for analyzing physical properties.

Figure 7:
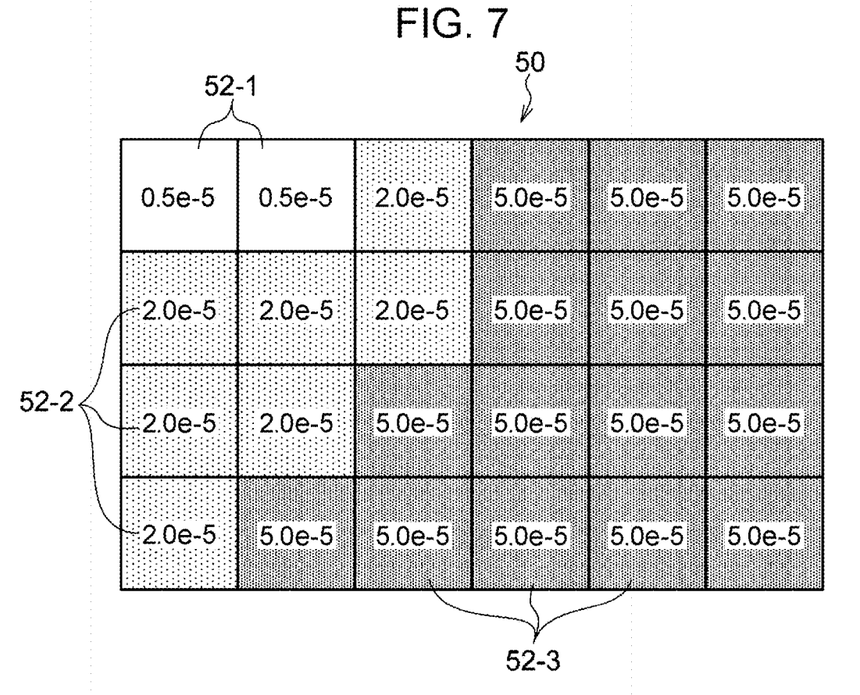
FIG. 7 is a diagram illustrating an example of physical property values of three-dimensional elements.

FIG. 7 illustrates an example of physical property values of three-dimensional elements at a time when the still stiffness analysis has been conducted on a three-dimensional object 50. In the example illustrated in FIG. 7, the three-dimensional object 50 is a rectangular parallelepiped for the sake of simplicity. The three-dimensional elements of the three-dimensional object 50 are regular hexahedrons, that is, cubes. A value written in each of the three-dimensional elements indicates the amount of displacement from coordinates of the center of the three-dimensional element as a physical property value.

In the example illustrated in FIG. 7, three-dimensional elements 52-1 whose physical property values are $0.5e-5$, three-dimensional elements 52-2 whose physical property values are $2.0e-5$, and three-dimensional elements 52-3 whose physical property values are $5.0e-5$ are included.

Figure 8:
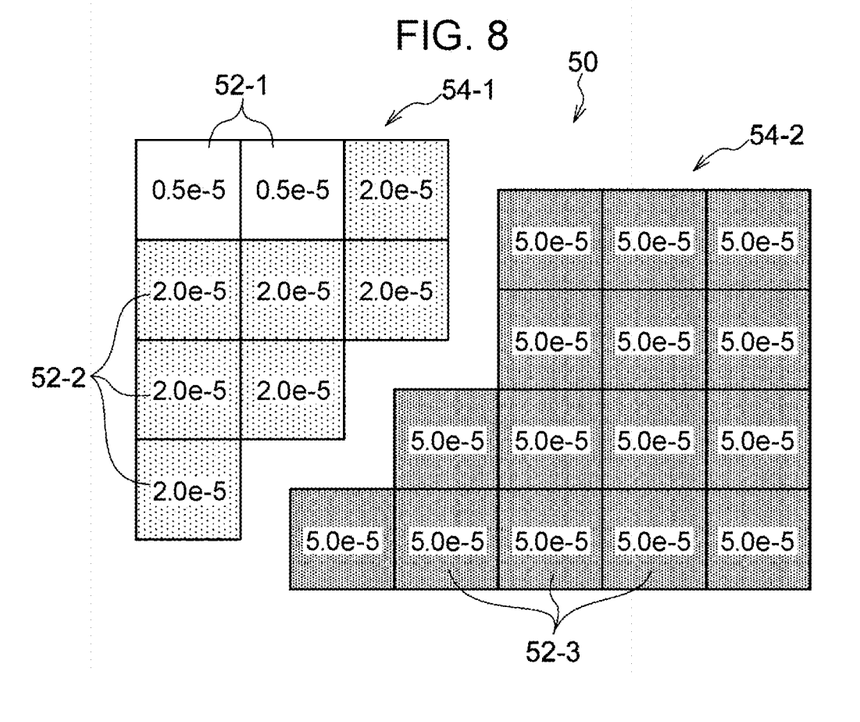
FIG. 8 is a diagram illustrating an example of sub-objects obtained by dividing a three-dimensional object.

In step S108, the three-dimensional object is divided into a plurality of sub-objects on the basis of a result of comparison between the physical property value of each of the plurality of three-dimensional elements and a predetermined threshold. It is assumed in the example illustrated in FIG. 7, for example, that the threshold is set as $3.5e-5$. In this case, as illustrated in FIG. 8, the three-dimensional object 50 is divided into a sub-object 54-1 including the three-dimensional elements 52-1 and 52-2 and a sub-object 54-2 including the three-dimensional elements 52-3. Since there is only one threshold in the example illustrated in FIG. 7, the three-dimensional object 50 is divided into two sub-objects corresponding to two ranges of physical property values. The number of sub-objects, however, is not limited to one. A plurality of thresholds may be set, and the three-dimensional object 50 may be divided into three or more sub-objects corresponding to three or more ranges of physical property values, instead.

In step S110, a representative value, that is, for example, an average, of the physical property values of the three-dimensional elements included in each of the sub-objects obtained as a result of the division performed in step S108 is calculated. In the example illustrated in FIG. 7, an average of the physical property values of the three-dimensional elements 52-1 and 52-2 included in the sub-object 54-1 and an average of the physical property values of the three-dimensional elements 52-3 included in the sub-object 54-2 are calculated.

In step S112, three-dimensional object data is generated by setting forming conditions corresponding to the representative value for each of the plurality of three-dimensional elements using the predetermined correspondences between representative values of the physical property values and forming conditions of the three-dimensional forming apparatus 100 that forms the three-dimensional object.

Figure 9:
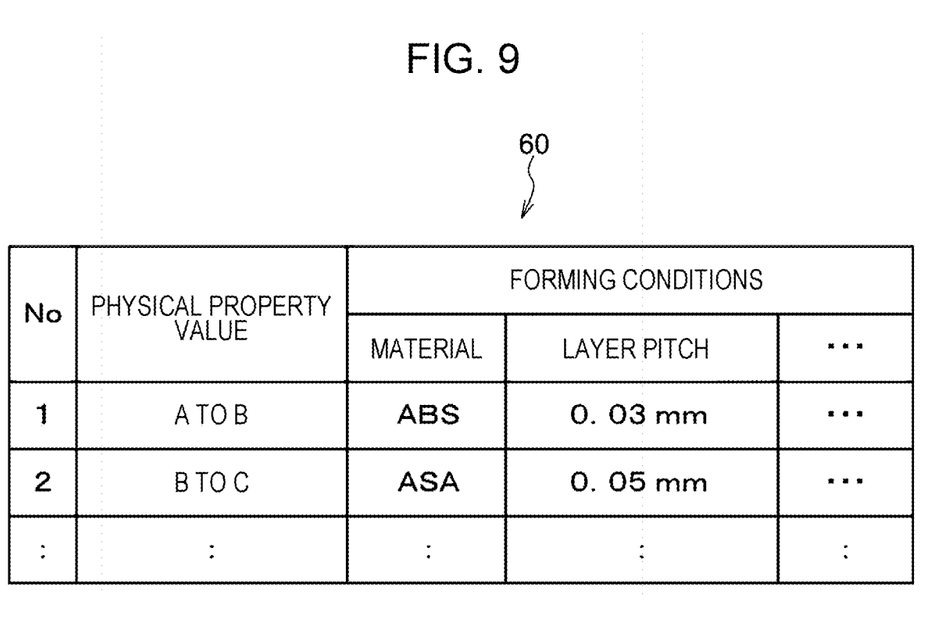
FIG. 9 is a diagram illustrating an example of table data indicating correspondences between physical property values and forming conditions.

As illustrated in FIG. 9, for example, forming conditions corresponding to the representative value is set for each of the three-dimensional elements using table data 60 indicating correspondences between physical property values and forming conditions. For example, the table data 60 may be stored in the storage unit 20 in advance or obtained from an external apparatus through the communication unit 18. As illustrated in FIG. 9, combinations of ranges of physical property values and forming conditions are set in the table data 60. The forming conditions correspond to a forming method employed by the three-dimensional object forming apparatus 100. Although material, layer pitch, and the like are set in the example illustrated in FIG. 9 as the forming conditions, the forming conditions are not limited to these.

The forming conditions change depending on a function required for a three-dimensional object. When the function required for a three-dimensional object is to minimize deformation of the three-dimensional object within a predetermined weight, for example, the amount of displacement of three-dimensional elements is calculated as physical property values by conducting the still stiffness analysis. In this case, in order to decrease the amount of displacement in the entirety of the three-dimensional object, forming conditions need to be set for three-dimensional elements included in a sub-object whose amount of displacement is large such that Young's moduli of the three-dimensional elements included in the sub-object whose amount of displacement is large become higher than those of three-dimensional elements included in a sub-object whose amount of displacement is small. Forming conditions also need to be set for the three-dimensional elements included in the sub-object whose amount of displacement is small such that Young's moduli of the three-dimensional elements included in the sub-object whose amount of displacement is small becomes lower than those of the three-dimensional elements included in the sub-object whose amount of displacement is large and the three-dimensional elements included in the sub-object whose amount of displacement is small become lighter than the three-dimensional elements included in the sub-object whose amount of displacement is large. Table data corresponding to the function required for the three-dimensional object is therefore used. When the table data 60 illustrated in FIG. 9 is table data to be used when deformation of a three-dimensional object is to be minimized, for example, forming conditions are set such that Young's moduli increase as the physical property values increase and Young's moduli decrease and the three-dimensional elements become lighter as the physical property values decrease. As a result, a structure with which deformation of the three-dimensional object is minimized within a predetermined weight is achieved.

When the function required for the three-dimensional object is to disperse stress (pressure) against distributed force, forming conditions are set such that Young's moduli decrease as the physical property values increase and increase as the physical property values decrease. As a result, stress is dispersed when distributed force is applied to the three-dimensional object.

When the function required for the three-dimensional object is to equalize increases in temperature between parts of the three-dimensional object, forming conditions are set such that heat transfer performance increases as heat flux increases, and decreases as heat flux decreases.

In step S114, the three-dimensional object data generated in step S112 is stored in the storage unit 20.

Desired performance might not necessarily be achieved depending on the threshold set in the calculation of physical property values in step S106.

A plurality of pieces of three-dimensional object data may therefore be generated by repeating steps S108 to S114 for a plurality of different thresholds.

In this case, the user may select one of the plurality of pieces of three-dimensional object data generated for the plurality of thresholds.

Alternatively, among the plurality of pieces of three-dimensional object data generated for the plurality of thresholds, one that satisfies a predetermined performance condition may be stored in the storage unit 20. More specifically, when the function required for the three-dimensional object is to minimize deformation of the three-dimensional object within a predetermined weight, for example, physical property values, that is, the amount of displacement, of each of the three-dimensional elements is calculated using, for the plurality of pieces of three-dimensional object data, the analysis method used in step S106. A cumulative value of the amount of displacement of each of the three-dimensional elements is then calculated. A three-dimensional object formed with a piece of three-dimensional object data whose cumulative value is the smallest will be least deformed. The piece of three-dimensional data whose cumulative value is the smallest among cumulative values of the amount of displacement calculated for the plurality of pieces of three-dimensional object data is therefore stored in the storage unit 20 as three-dimensional object data that satisfies the predetermined performance condition.

In addition, steps S108 to S112 and the process for determining whether the three-dimensional object data generated in step S112 satisfies the predetermined performance condition may be repeated until the predetermined performance condition is satisfied. When the function required for the three-dimensional object is to equalize the amount of displacement between parts of the three-dimensional objects, for example, the process for determining whether the predetermined performance condition is satisfied is as follows. First, the amount of displacement of each of the three-dimensional elements is calculated using, for the three-dimensional object data generated in step S112, the analysis method used in step S106, and a cumulative value of the calculated amount of displacement is calculated. Whether the calculated cumulative value is equal to or smaller than a predetermined threshold is then determined. If so, it is determined that the predetermined performance condition is satisfied.

The obtaining unit 110 of the three-dimensional object forming apparatus 100 obtains voxel data transmitted from the three-dimensional object data generation apparatus 10. The control unit 112 drives the discharge head driving unit 104 to move the discharge head 102 in two dimensions and controls the discharge of a forming material by the discharge head 102 such that the forming material is discharged in accordance with the voxel data obtained by the obtaining unit 110. The three-dimensional object is thus formed.

Figure 10:
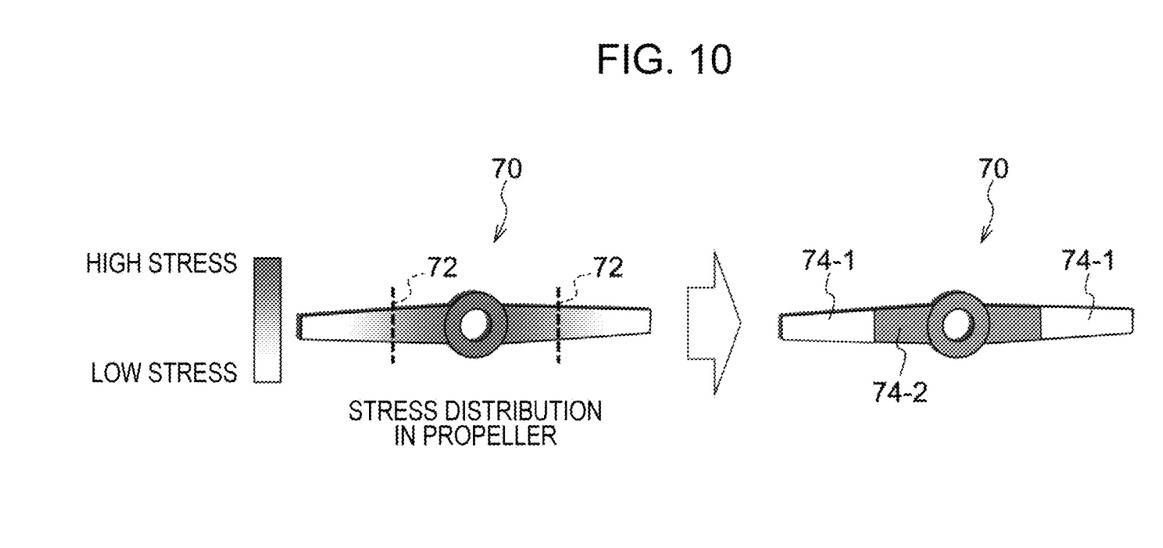
FIG. 10 is a diagram illustrating the stress distribution of a propeller.

Next, examples of applications of the present disclosure will be described. The present disclosure is suitable when, for example, three-dimensional object data regarding a propeller 70 illustrated in FIG. 10 is generated. When the propeller 70 is driven, high stress is caused around a rotational shaft, and stress is lower around tips. In the example illustrated in FIG. 10, the propeller 70 is divided in accordance with whether stress as a physical property value is equal to or larger than a threshold. More specifically, the propeller 70 is divided into sub-objects 74-1 outside broken lines 72, that is, around the tips of the propeller 70, and a sub-object 74-2 inside the broken lines 72, that is, around the rotational shaft of the propeller 70.

A low-stiffness, light material is set for three-dimensional elements included in the low-stress sub-objects 74-1 as forming conditions, and a high-stiffness, heavy material is set for three-dimensional elements included in the high-stress sub-object 74-2 as forming conditions. As a result, a light, sufficiently strong structure is achieved.

Figure 11:
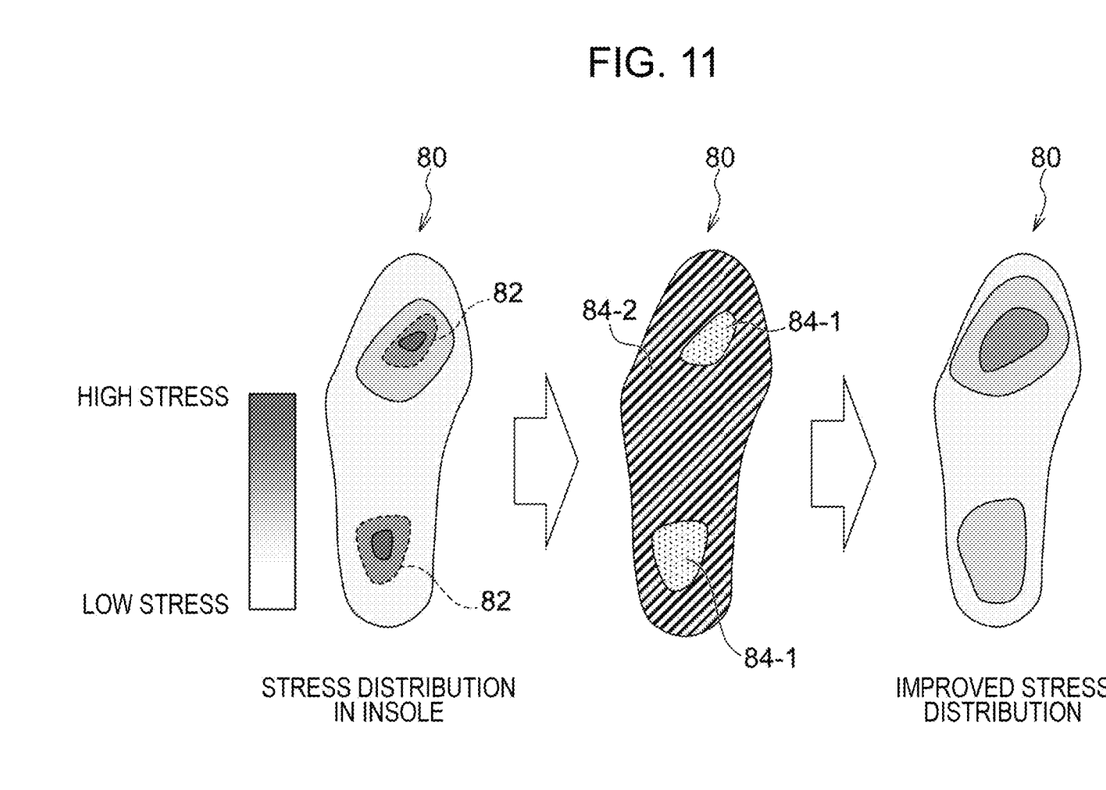
FIG. 11 is a diagram illustrating the stress distribution of an insole.

The present disclosure is also suitable when, for example, three-dimensional object data regarding an insole 80 of a shoe illustrated in FIG. 11 is generated. As illustrated in FIG. 11, when a person is standing, stress is high in two areas of the insole 80 surrounded by broken lines 82 and low in other areas. Stress caused in the insole 80 when a person is standing is calculated as physical property values. A soft material is then set for three-dimensional elements included in high-stress sub-objects 84-1 as forming conditions, and a hard material is set for three-dimensional elements included in a low-stress sub-object 84-2 as forming conditions. As a result, as illustrated in FIG. 11, stress distribution improves. That is, an insole that disperses stress and relieves fatigue is achieved.

Although the present disclosure has been described using an exemplary embodiment, the present disclosure is not limited to the above exemplary embodiment. The exemplary embodiment may be modified or improved in various ways without deviating from the scope of the present disclosure. The technical scope of the present disclosure also includes such modifications and improvements.

Figure 12:
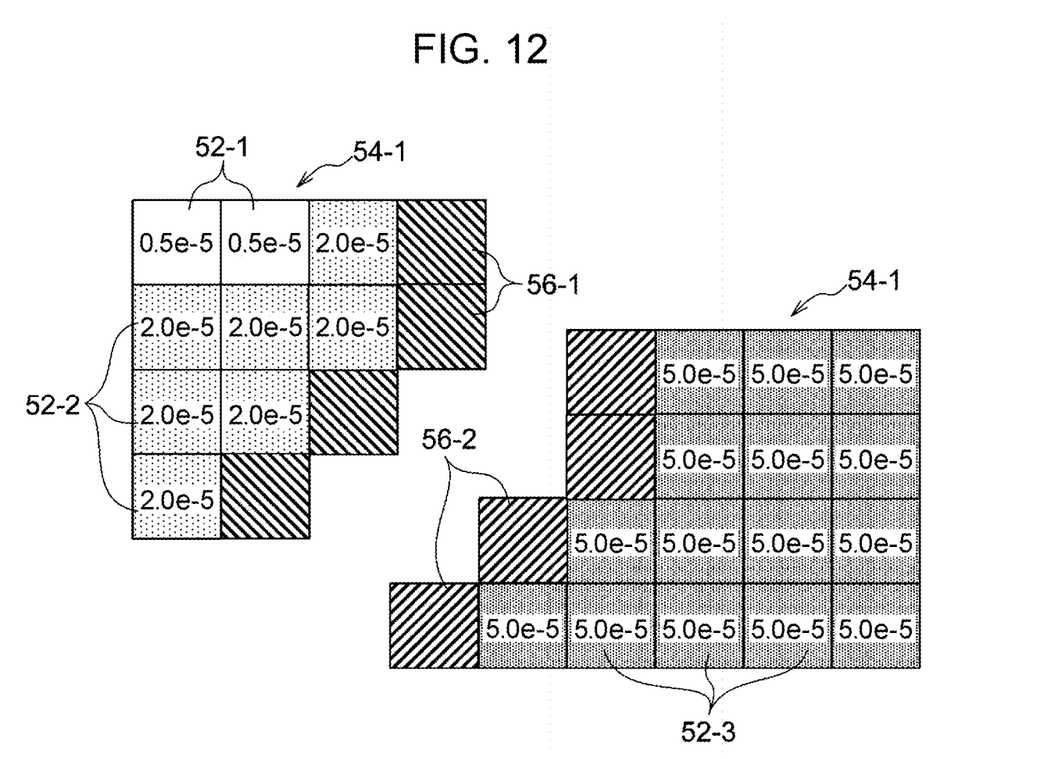
FIG. 12 is a diagram illustrating three-dimensional elements added to boundary portions of the sub-objects.

Since forming conditions are set for each sub-object in the present exemplary embodiment, for example, a gap or the like might be caused at a boundary between the sub-objects 54-1 and 54-2 when the three-dimensional object 50 illustrated in FIG. 5 has been actually formed. As illustrated in FIG. 12, therefore, three-dimensional elements 56-1 and 56-2 may be added to boundary portions of the sub-objects 54-1 and 54-2, respectively, so that the sub-objects 54-1 and 54-2 partially overlap with each other.

Although physical property values are calculated in step S106 illustrated in FIG. 6 by analyzing physical properties using a single analysis method in the present exemplary embodiment, physical property values may be calculated by analyzing physical properties using a plurality of analysis methods, and the calculated physical property values may be combined together. In this case, the physical property values may be combined together in accordance with combination ratios. More specifically, when a physical property value calculated by analyzing a physical property using an analysis method A is denoted by PA and a physical property value calculated by analyzing a physical property using an analysis method B, which is different from the analysis method A, is denoted by PB, a physical property value PC, which is a total physical property value, is calculated using the following expression.

$$PC = \alpha PA + \beta PB$$

where $\alpha$ denotes a combination ratio for the physical property value calculated by analyzing the physical property value using the analysis method A, and $\beta$ denotes a combination ratio for the physical property value calculated by analyzing the physical property value using the analysis method B. Here, $\alpha + \beta = 1$, and, for example, $\alpha = 0.4$ and $\beta = 0.6$. For example, values of $\alpha$ and $\beta$ are stored in the storage unit 20 in advance.

Physical properties need not necessarily be analyzed using two analysis methods. Physical properties may be analyzed using three or more analysis methods, and physical property values calculated as a result of the analyses may be combined together, instead.

A three-dimensional object that satisfies a plurality of types of performance can thus be obtained by combining together physical property values calculated by analyzing physical properties using a plurality of analysis methods.

Although the three-dimensional object data generation apparatus 10 and the three-dimensional object forming apparatus 100 that forms three-dimensional objects on the basis of three-dimensional object data are separately provided in the above exemplary embodiment, the three-dimensional object forming apparatus 100 may have the function of the three-dimensional object data generation apparatus 10, instead.

That is, the obtaining unit 110 of the three-dimensional object forming apparatus 100 may obtain voxel data, and the control unit 112 may generate three-dimensional object data by performing the generation process illustrated in FIG. 6.

Alternatively, for example, the process for generating three-dimensional object data illustrated in FIG. 6 may be achieved by hardware such as an application-specific integrated circuit (ASIC). In this case, processing speed increases compared to when the process is achieved by software.

Although the program for generating three-dimensional object data is installed on the storage unit 20 in the above exemplary embodiment, the process need not be installed on the storage unit 20. The program according to the above exemplary embodiment may be provided in a computer readable medium, instead. For example, the program in the present disclosure may be provided in an optical disc such as a compact disc read-only memory (CD-ROM) or a digital versatile disc read-only memory (DVD-ROM) or a semiconductor memory such as a universal serial bus (USB) memory or a memory card. Alternatively, the program according to the above exemplary embodiment may be obtained from an external apparatus through a communication line connected to the communication unit 18.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A three-dimensional object forming apparatus comprising:
a processor, configured to:
obtain, using three-dimensional object data indicating a three-dimensional object represented by a plurality of three-dimensional elements, physical property values calculated by analyzing physical properties at a time when the three-dimensional object to be formed under a predetermined forming condition, the physical property values indicating the physical properties of the plurality of three-dimensional elements, wherein the three dimensional object data is converted from surface shape data indicating a surface shape of the three-dimensional object;
divide the three-dimensional object into a plurality of sub-objects on a basis of a result of comparison between the physical property value of each of the plurality of three-dimensional elements and a predetermined threshold;

calculate a representative value of physical property values of three-dimensional elements included in each of the plurality of sub-objects; and generate the three-dimensional object data by setting a forming condition corresponding to the representative value for each of the plurality of three-dimensional elements using predetermined correspondences between the representative values and forming conditions of a three-dimensional object forming apparatus that forms the three-dimensional object; and a forming unit that forms the three-dimensional object under the forming condition corresponding to the three-dimensional object data.

2. The three-dimensional object forming apparatus according to claim 1, wherein the processor analyzes the physical properties using an analysis method corresponding to a function required for the three-dimensional object.

3. The three-dimensional object forming apparatus according to claim 2, wherein the processor is further configured to:

receive the analysis method.

4. The three-dimensional object forming apparatus according to claim 1, wherein the processor calculates the physical property values by analyzing the physical properties using a plurality of analysis methods and combines together the calculated physical property values.

5. The three-dimensional object forming apparatus according to claim 4, wherein the processor combines together the physical property values in accordance with a combination ratio.

6. The three-dimensional object forming apparatus according to claim 1, wherein the processor performs a process for dividing the three-dimensional object into a plurality of sub-objects for each of a plurality of thresholds, wherein the processor performs a process for calculating the representative values for each of the plurality of thresholds, and wherein the processor generates the three-dimensional object data for each of the plurality of thresholds.

7. The three-dimensional object forming apparatus according to claim 6, wherein the processor outputs, in the three-dimensional object data generated for the plurality of thresholds, a piece of three-dimensional object data that satisfies a predetermined performance condition.

8. The three-dimensional object forming apparatus according to claim 6, wherein the processor is further configured to:

receive a piece of the three-dimensional object data generated for the plurality of thresholds.

9. The three-dimensional object forming apparatus according to claim 1, wherein the processor is further configured to:

perform control such that processes performed by the processor and a process for determining whether the generated three-dimensional object data satisfies a predetermined performance condition are repeated until the predetermined performance condition is satisfied.

10. The three-dimensional object forming apparatus according to claim 1, wherein the processor adds three-dimensional elements to boundary portions of the plurality of sub-objects to cause the plurality of sub-objects to partially overlap each other at the boundary portions.

11. A non-transitory computer readable medium storing a program causing a computer to execute a process, the process comprising:

obtaining, using three-dimensional object data indicating a three-dimensional object represented by a plurality of three-dimensional elements, physical property values calculated by analyzing physical properties at a time when the three-dimensional object to be formed under a predetermined forming condition, the physical property values indicating the physical properties of the plurality of three-dimensional elements, wherein the three dimensional object data is converted from surface shape data indicating a surface shape of the three-dimensional object;

dividing the three-dimensional object into a plurality of sub-objects on a basis of a result of comparison between the physical property value of each of the plurality of three-dimensional elements and a predetermined threshold;

calculating a representative value of physical property values of three-dimensional elements included in each of the plurality of sub-objects;

generating the three-dimensional object data by setting a forming condition corresponding to the representative value for each of the plurality of three-dimensional elements using predetermined correspondences between the representative values and forming conditions of a three-dimensional object forming apparatus that forms the three-dimensional object; and forming the three-dimensional object under the forming condition corresponding to the three-dimensional object data.

* * * * *